United States Patent
Brown et al.

(10) Patent No.: US 8,396,211 B2
(45) Date of Patent: Mar. 12, 2013

(54) SYSTEM AND METHOD FOR DYNAMIC MODIFICATION OF ALLOWABLE ELECTRONIC MESSAGE PROPERTIES

(75) Inventors: Michael K. Brown, Ontario (CA);
Michael S. Brown, Ontario (CA);
Michael G. Kirkup, Ontario (CA)

(73) Assignee: Research In Motion Limited, Waterloo, Ontario (CA)

( * ) Notice: Subject to any disclaimer, the term of this patent is extended or adjusted under 35 U.S.C. 154(b) by 1708 days.

(21) Appl. No.: 11/456,601

(22) Filed: Jul. 11, 2006

(65) Prior Publication Data

US 2008/0013717 A1 Jan. 17, 2008

(51) Int. Cl.
*H04L 9/00* (2006.01)
*H04L 9/30* (2006.01)
*H04L 29/06* (2006.01)
*H04L 9/32* (2006.01)
*H04K 1/00* (2006.01)

(52) U.S. Cl. .......... 380/30; 380/247; 380/248; 380/249; 380/250; 713/152; 713/155; 713/168; 713/169; 713/170; 713/171; 713/172; 713/173; 713/174; 713/175; 713/176; 713/177; 713/178; 713/179; 713/180; 713/181; 726/2; 726/3; 726/4; 726/11; 726/14; 726/27

(58) Field of Classification Search .................. 713/152, 713/155, 168–181; 726/2, 3, 14, 11, 27; 380/247–250, 30
See application file for complete search history.

(56) References Cited

U.S. PATENT DOCUMENTS

| 5,333,266 | A | * | 7/1994 | Boaz et al. | 709/206 |
| 6,065,056 | A | * | 5/2000 | Bradshaw et al. | 709/229 |
| 6,212,553 | B1 | * | 4/2001 | Lee et al. | 709/206 |
| 6,460,074 | B1 | * | 10/2002 | Fishkin | 709/206 |

(Continued)

FOREIGN PATENT DOCUMENTS

| EP | 1 365 340 | 11/2003 |
| GB | 2 405 293 | 2/2005 |

(Continued)

OTHER PUBLICATIONS

European Search Report dated Jun. 19, 2008, European Application No. 08155036.0.

(Continued)

*Primary Examiner* — Edan Orgad
*Assistant Examiner* — Kari Schmidt
(74) *Attorney, Agent, or Firm* — Bereskin & Parr LLP/ S.E.N.C.R.L., s.r.l

(57) ABSTRACT

A system and method for dynamically and automatically updating the appropriate fields on the message application screen of an electronic message to show which of the appropriate service book, security encoding or security properties are acceptable or allowed for the message being composed. This updating occurs automatically based on the contents of the fields that are modified during composition of the message, such as, for example, modifications to classification of the message, recipients, keywords, or the like. Thus, the properties in place for a given message is reflected in a dynamic options list provided to the user based on the contents of various fields of the electronic message and the system policies resident on the system. The dynamic updating may provide an updated list of options to the user, or may optionally automatically apply minimum level settings based on security policy and contents of the message.

34 Claims, 10 Drawing Sheets

U.S. PATENT DOCUMENTS

| | | | | |
|---|---|---|---|---|
| 6,785,681 B2* | 8/2004 | Keskar et al. | | 1/1 |
| 7,007,066 B1* | 2/2006 | Malik | | 709/206 |
| 7,092,993 B2* | 8/2006 | Goldberg | | 709/206 |
| 7,127,741 B2* | 10/2006 | Bandini et al. | | 726/14 |
| 7,209,951 B2* | 4/2007 | Goldberg | | 709/206 |
| 7,401,356 B2* | 7/2008 | Bandini et al. | | 726/14 |
| 7,634,280 B2* | 12/2009 | Modeo | | 455/466 |
| 7,774,421 B2* | 8/2010 | Dubovsky et al. | | 709/206 |
| 2002/0007453 A1 | 1/2002 | Nemovicher | | |
| 2002/0070973 A1* | 6/2002 | Croley | | 345/780 |
| 2002/0169954 A1* | 11/2002 | Bandini et al. | | 713/153 |
| 2003/0135565 A1* | 7/2003 | Estrada | | 709/206 |
| 2003/0222923 A1 | 12/2003 | Li | | |
| 2006/0236142 A1* | 10/2006 | Karn | | 713/300 |
| 2007/0233610 A1* | 10/2007 | Gyllenskog et al. | | 705/64 |
| 2007/0245416 A1* | 10/2007 | Dickinson et al. | | 726/14 |

FOREIGN PATENT DOCUMENTS

| | | |
|---|---|---|
| WO | WO 03/001326 A2 | 1/2003 |

OTHER PUBLICATIONS

Search Report dated Aug. 21, 2006; App. No. 06116961.
European Communication dated Mar. 26, 2010, European Patent Application No. 08155036.0.
European Communication under Rule 71(3) dated Jun. 3, 2008, European Patent Application No. 06116961.1.
European Decision to Grant dated Oct. 23, 2008, European Patent Application No. 06116961.1.
Canadian Office Action dated Aug. 31, 2010, Canadian Patent Application No. 2,593,330.

* cited by examiner

Classification: Unclassified
Encoding: PGP [Encrypt]
To: PGP [Sign and Encrypt]
Cc: PGP [Sign]
Subject: Plain Text
S/MIME [Encrypt]
S/MIME [Sign and Encrypt]
S/MIME [Sign]

*Fig. 7A*

Classification: Unclassified
Encoding:   Plain Text
To:
Cc:
Subject:

*Fig. 7B*

Classification: Protected
Encoding: PGP [Sign and Encrypt]
To: PGP [Sign]
Cc: S/MIME [Sign and Encrypt]
Subject: S/MIME [Sign]

*Fig. 7C*

Classification: Protected
Encoding: PGP [Sign and Encrypt]
To:
Cc:
Subject:

*Fig. 7D*

Classification: Top Secret
Encoding: PGP [Sign and Encrypt]
To: S/MIME [Sign and Encrypt]
Cc:
Subject:

*Fig. 7E*

Classification: Unclassified
Encoding: Plain Text
To: John Doe
Cc:
Subject:

*Fig. 7F*

SYSTEM AND METHOD FOR DYNAMIC MODIFICATION OF ALLOWABLE ELECTRONIC MESSAGE PROPERTIES

BACKGROUND

1. Technical Field

The present disclosure relates generally to the application of various properties, such as, for example, security properties, to electronic messages. In particular, the disclosure is directed to a system and method for dynamically modifying allowable properties of electronic messages based on the contents of the message being composed.

2. Related Art

Exchanging secured electronic messages and data, such as, for example, e-mail messages, is well known. Secured electronic messaging typically requires the user to implement or apply various security encoding or other security properties to the message, based on the security policies under which the system is being operated. Various methods have been developed to ensure that a user properly implements the security policy of the system when composing electronic messages.

For example, the user may select a type of message service, the security encoding and the security properties to be applied to a message. However, with the introduction of background fetching of security policies and keys based on policies attendant with the system, the type of message service, security encoding or the security properties selected by the user might not be allowed. For example, the system security policy may require that all protected messages be PGP signed and encrypted. However, when the user elects to compose and send a protected message, the user may be given the option of selecting S/MIME sign and encrypt to protect the message in addition to the option of using PGP sign and encrypt. Because the user has been given multiple options, the user may select S/MIME sign and encrypt to the protected message. In this exemplary instance, because the security encoding selected by the user is not allowed by the system security policy, the user will be unable to send the message. Typically, the user will not know that he has violated a security policy until he attempts to send the message. The user must then determine which security properties are acceptable in view of the IT policy and then apply appropriate properties to the protected message. This type of arrangement can be very frustrating, time consuming and is unnecessarily complex for users who simply want to send a protected message. Thus, a system and method for alleviating such user confusion and frustration is needed to improve the user experience, and to ensure that the user implements the security policy rather than simply sending messages in the clear or otherwise circumventing the security policy of the system.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which:

FIGS. 7A-7G are exemplary screen shots illustrating exemplary display of security options to a user according to various embodiments;

DETAILED DESCRIPTION OF EXEMPLARY EMBODIMENTS

Figure 1:
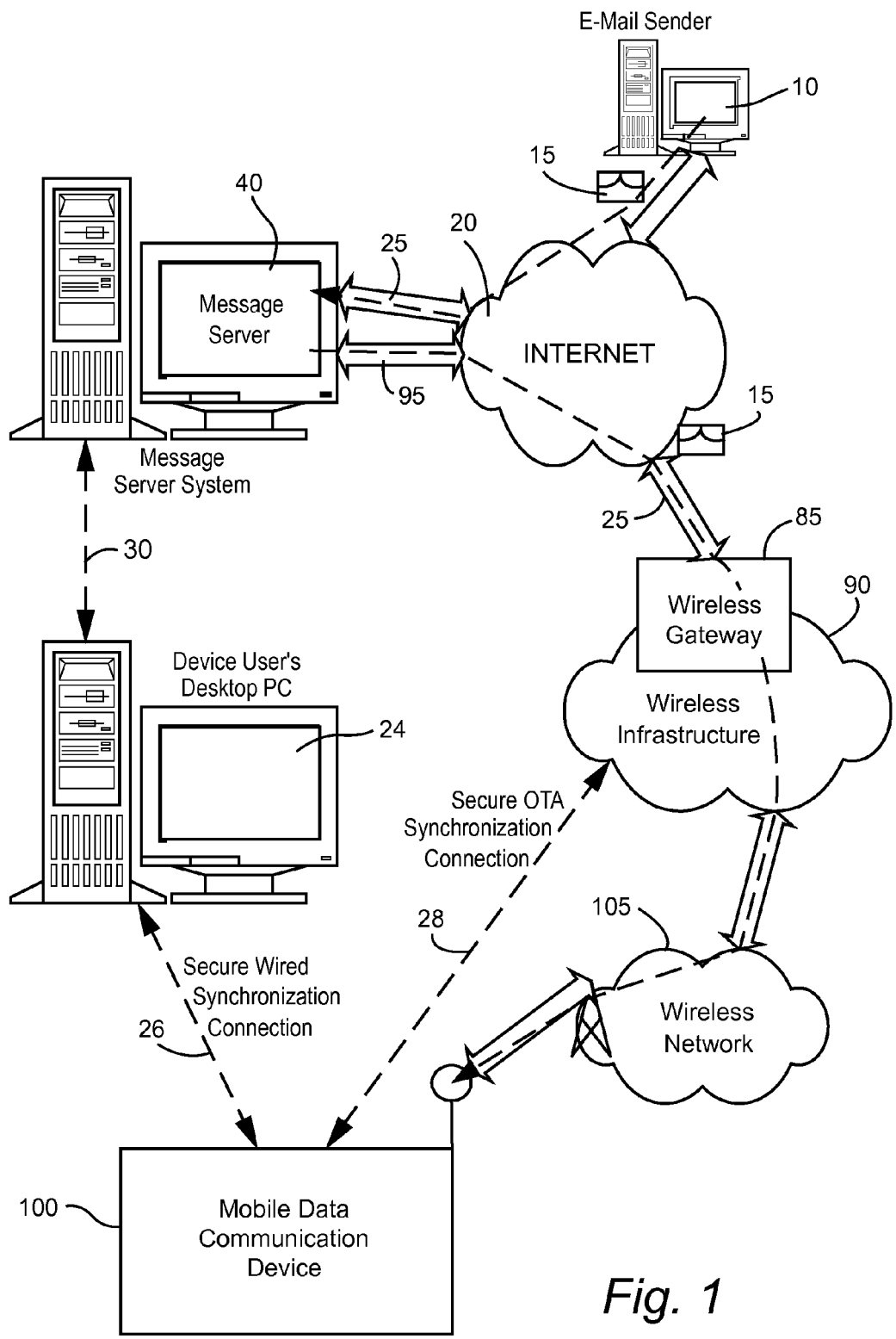
FIG. 1 is an overall system wide schematic view of an exemplary wireless e-mail communication system incorporating a mobile wireless communications device in accordance with an exemplary embodiment of the present invention.

In view of the foregoing, we have now identified an improved system and method for dynamically and automatically updating the appropriate fields on the message application screen to show which of the appropriate type of message service, security encoding or security properties are acceptable or allowed for the message being composed. This updating will occur automatically based on the contents of the fields that are modified during composition of the message, such as, for example, modifications to classification of the message, recipients, keywords, or the like. Thus, the properties applied to a given message are reflected in a dynamic options list provided to the user based on the contents of various fields of the electronic message and the IT policy that is in place on the system. While this system is suitable for any type of electronic messaging system, it has particular applicability to systems that use mobile wireless communication devices with electronic messaging capability.

According to an exemplary embodiment the security options available to a user are automatically updated based on the entries made by the user in various fields of the message. The updated security options may be displayed to the user in an updated options list. For example, an electronic message may include fields relating to classification of the message, encoding options available for the message, recipients of the message (including the primary recipient(s) and those who are cc'd), subject of the message, the text of the message, or the like. According to the classification selection made by the user, for example, the available encoding options are automatically updated to reflect those options that are available to the user and allowed by the system security policy. The user may then be prompted to make a selection from the updated list if the previously selected option is no longer valid or applicable. Likewise, if certain recipients of the message are associated with various security related requirements, the security encoding settings available to the user or required by the system will be automatically updated. The system may also check the contents of the subject line and/or the text of the message itself for keywords that might require the application of certain security properties based on the security policies of the system. If an updating of the security options available for the message occurs, the user may be prompted to select the security options from the dynamically updated options list prior to sending the message. The updated list of options typically includes the minimum encoding requirements, and may be referred to as a trimmed list of options.

According to another exemplary embodiment, if the contents of the message cause an updating of the security options available for sending the message, the updated security settings may be automatically implemented by the system when the user executes the send command. For example, if the recipient of a message is an important corporate official, the security policy may require that all messages sent to this official must be, at a minimum, electronically signed. Therefore, even an unclassified plain text message may require a signature by virtue of the recipients to whom the message is to be sent. In this example, the user may be prompted to change the encoding of the message to a suitable level prior to sending. On the other hand, the user may be informed that the encoding of the message has automatically changed to a higher security level that reflects a minimum level of security commensurate with the security policy associated with the recipient. This type of automatic updating of security settings may be referred to as "rounding up" of the security settings. The user may either accept the automatically updated security settings by, for example, executing the send command, or the user may optionally select from the updated list of security options and select an even higher level of security encoding for the message that is allowed by the security policy as reflected in the updated security properties or encoding options made available to the user.

In yet another exemplary embodiment, the security settings may be adjusted based on the type of message service being used. For example, in a multiple message service environment in which multiple e-mail accounts are being used (e.g., home and office accounts), different classification levels and security policies may apply. Thus, the security options provided to the user may be based on the selection of which of multiple types of message services is being used.

According to another exemplary embodiment, the security options may be based on rules associated with services provided by third parties other than the system administrator. For example, a third party server may be used to set up e-mail security policies for users of the system. The remainder of the system security policy may be handled by the system administrator Restrictions that are provided by the third party server may be dynamically reflected to a user in a manner as set forth above so that the user may avoid making selections that are then later rejected because the selections violate the server based policies. The security policies that are set up by third parties may also implement the dynamic updating of security options provided to the user in the manner set forth herein with respect to the exemplary embodiments.

FIG. 1 is an overview of an example communication system in which a wireless communication device may be used. One skilled in the art will appreciate that there may be many different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE), integrated Digital Enhanced Network (iDEN), Evolution Data Optimized (EvDO), High-Speed Downlink Packet Access (HSDPA), Universal Mobile Telecommunications Systems (UMTS) or the like. Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
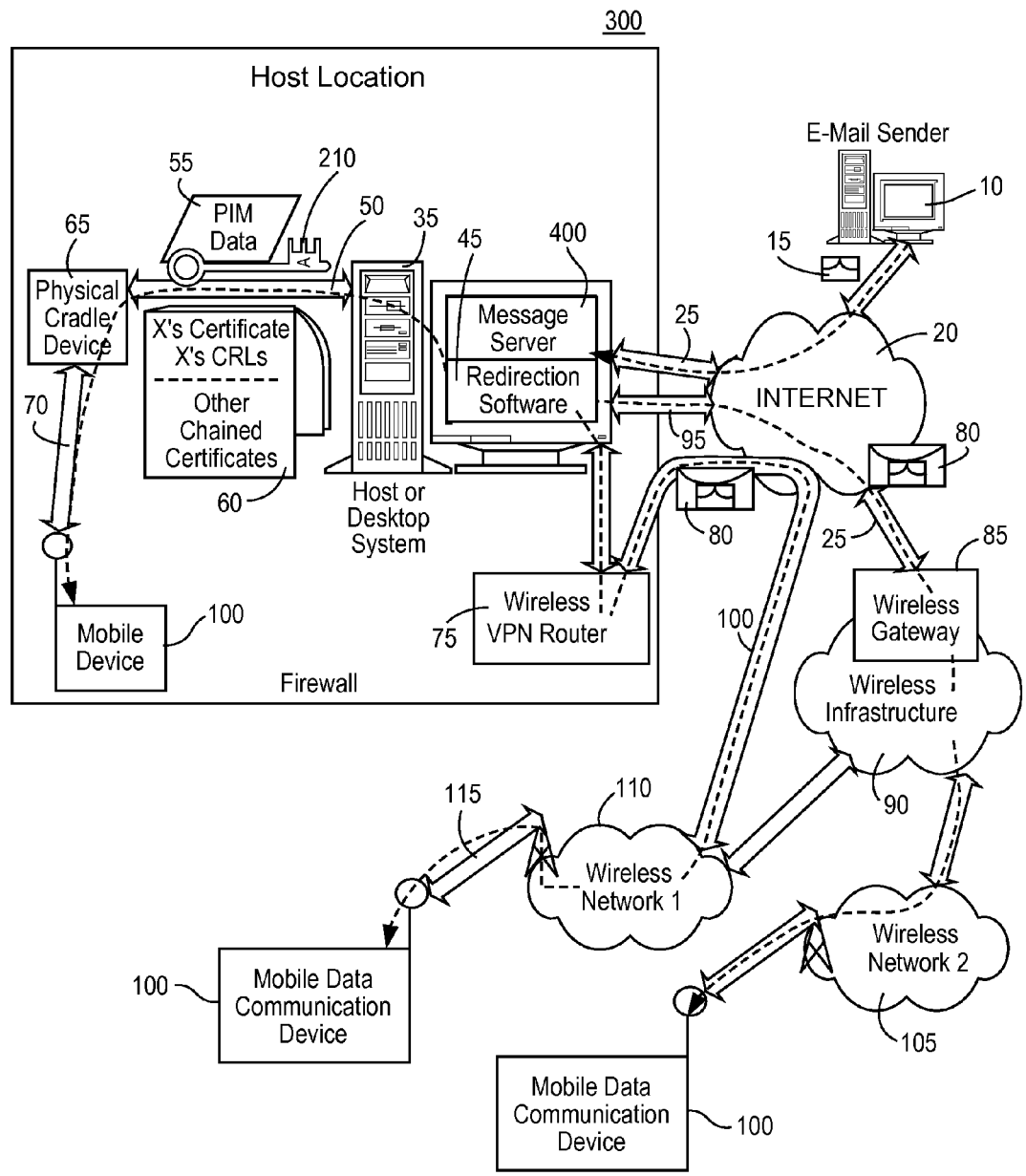
FIG. 2 is a block diagram of a further exemplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods. However, there are situations where a user does not have the ability to establish such a link to their desktop 35 in order to update the key store of the mobile device 100 with the appropriate private keys. In these situations, the system and method described herein allow the secure transfer of cryptographic information over a wireless link.

Figure 3:
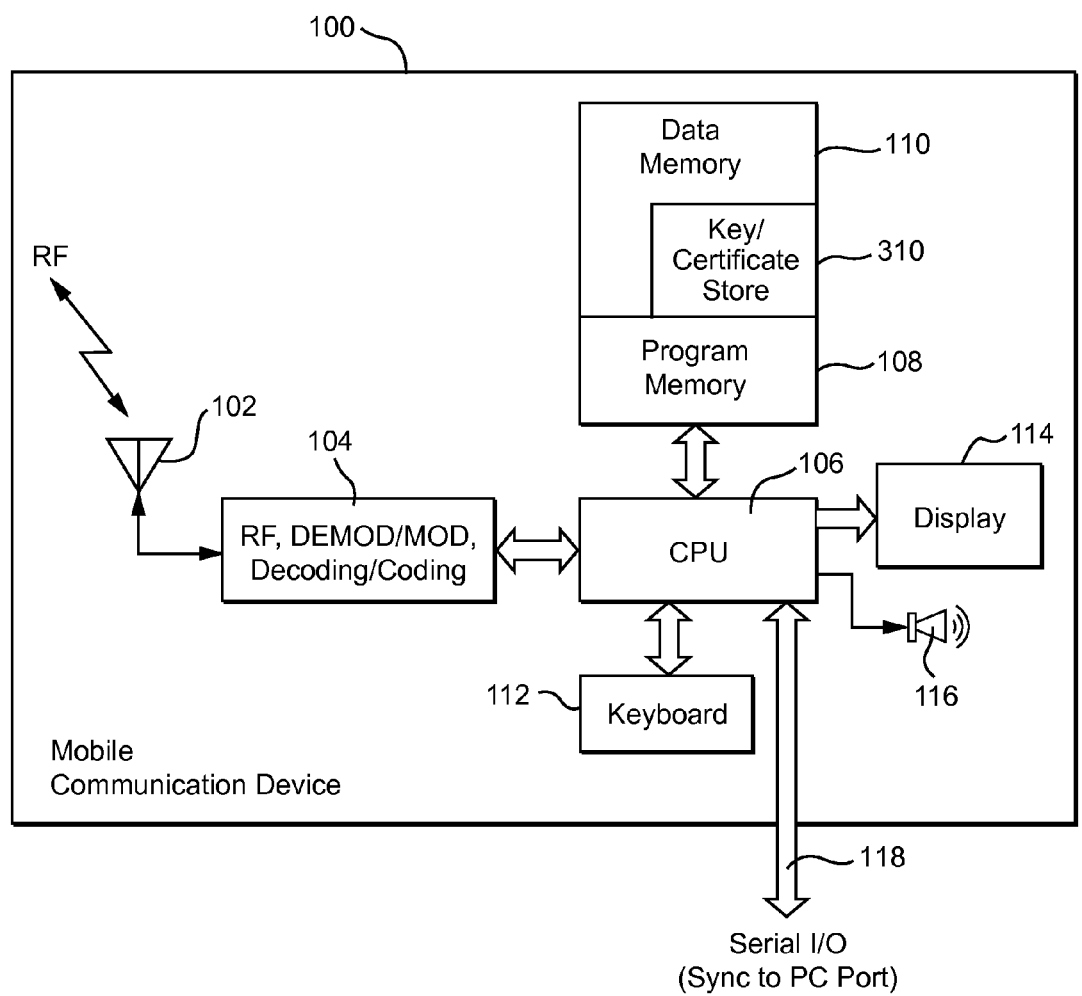
FIG. 3 is an abbreviated schematic diagram of hardware included within an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 20 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

Figure 4:
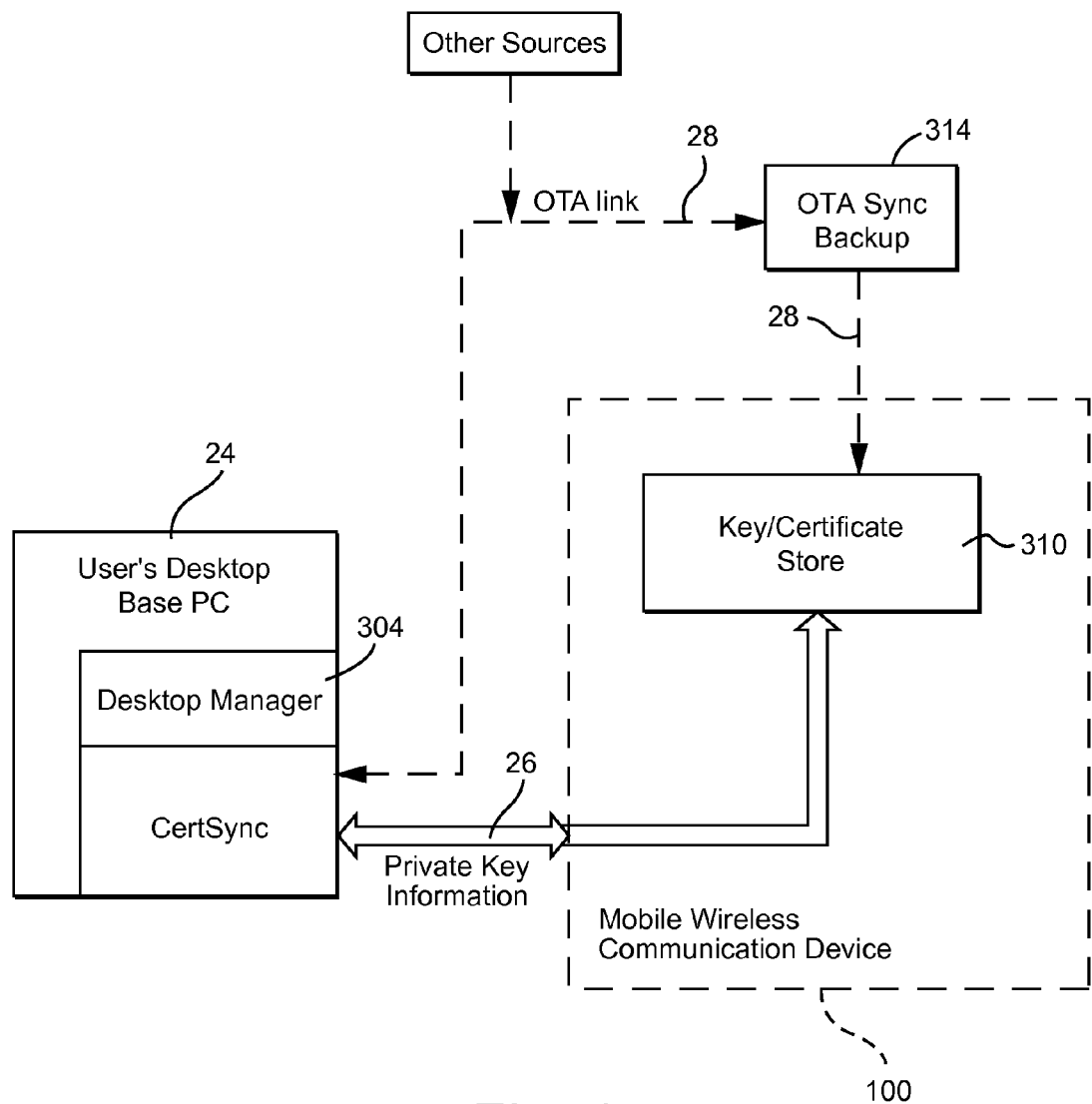
FIG. 4 is an abbreviated schematic functional diagram of the hardware/software utilized in an exemplary mobile wireless communication device in the exemplary embodiment of FIG. 1.

As depicted in FIG. 4, the user's base unit 24 may be used to update the mobile wireless communications device 100 with information including, for example, private key information and digital certificate information. The user's base station 24 is typically a desktop PC, and may be of conventional hardware and operating system design. It will typically include desktop manager program logic 304 (in the form of, for example, executable computer program logic) for managing, among other things, a normal data synchronization connection to device 100. As previously mentioned, in the environment of mobile wireless communications systems, such a desktop manager may typically include logic for synchronizing cryptographic message certificates. Such logic is denoted here as Cert Sync.

E-mail messages generated using the S/MIME and PGP techniques may include encrypted information, a digital signature on the message contents, or both. In signed S/MIME operations the sender takes a digest of a message and signs the digest using the sender's private key. A digest is essentially a checksum, CRC or other preferably non-reversible operation such as a hash of the message, which is then signed. The signed digest is appended to the outgoing message, possibly along with the certificate of the sender and possibly any required certificates or CRLs. The receiver of this signed message must also take a digest of the message, compare this digest with the digest appended to the message, retrieve the sender's public key, and verify the signature on the appended digest. If the message content has been changed, the digests will be different or the signature on the digest will not verify properly. If the message is not encrypted, this signature does not prevent anyone from seeing the contents of the message, but does ensure that the message has not been tampered with and is from the actual person as indicated on the "from" field of the message.

The receiver may also verify the certificate and CRL if they were appended to the message. A certificate chain is a certificate along with a number of other certificates required to verify that the original certificate is authentic. While verifying the signature on a signed message, the receiver of the message will also typically obtain a certificate chain for the signing certificate and verify that each certificate in the chain was signed by the next certificate in the chain, until a certificate is found that was signed by a root certificate from a trusted source, such as, for example, a large Public Key Server (PKS) associated with a Certificate Authority (CA), such as, for example, Verisign or Entrust, both prominent companies in the field of public key cryptography. Once such a root certificate is found, a signature can be verified and trusted, since both the sender and receiver trust the source of the root certificate.

In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 5:
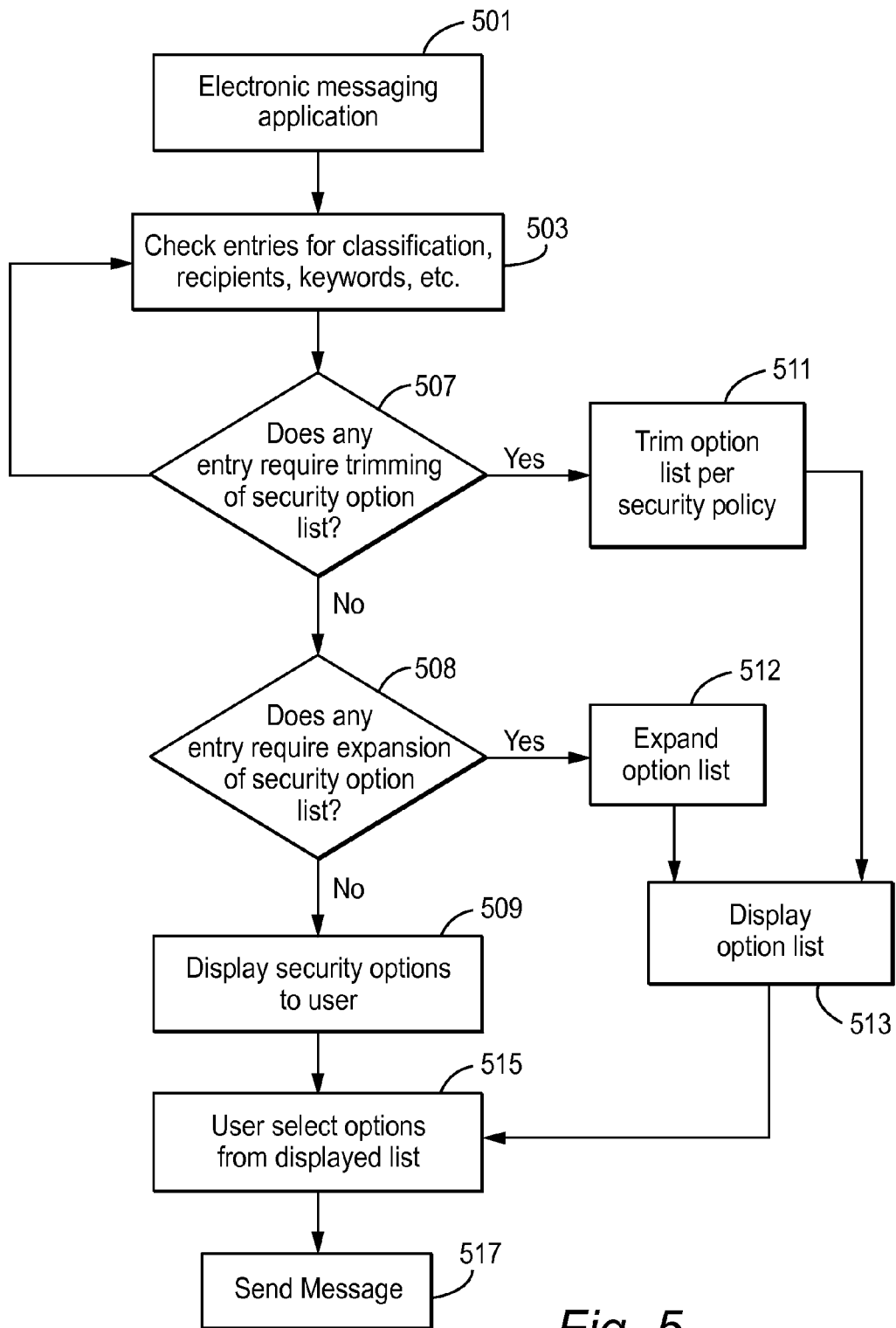
FIG. 5 is an exemplary abbreviated flow diagram of a system for dynamically and automatically updating security options available for a message based on the contents of the message.

FIG. 5 is an exemplary abbreviated flow diagram of a system for dynamically and automatically updating security options available for a message based on the contents of the message. According to this exemplary illustration, a user first enters an electronic messaging application 501 resident or accessible to the device being used by the user. Such devices may include, for example, a mobile wireless communication device that is capable of supporting electronic mail functions. As the user is making entries in the various fields of the electronic messaging application, program logic monitors the entries in the various fields 503 to determine what, if any, effect the entries may have on the security options available to the user. If the entry(ies) made by the user requires that the list of available security options be changed, such as, for example, reduced (or trimmed) or expanded 507, 508, a dynamically updated, and in the current example, trimmed, security option list is displayed to the user 511, 512. Whether or not to update, e.g., trim, the options list is determined based on the security policy that is in place for the electronic mailing system. The security policy may be implemented as IT policy by the system administrator or may be provided by a third party via an electronic messaging server, or the like. It will be understood that the security policy may be implemented by any suitable means, and that the disclosure is directed to a system and method for implementing security policies regardless of the source of the policy. If the system determines that there is no need to modify or limit the security options, it may display the full array of security encoding options to the user 509. Once the security options have been displayed to the user, whether trimmed or not, 509, 513, the user may then select from among the security options being displayed 515. The security option selected by the user is then applied to the message when the message is sent.

Figure 7G:
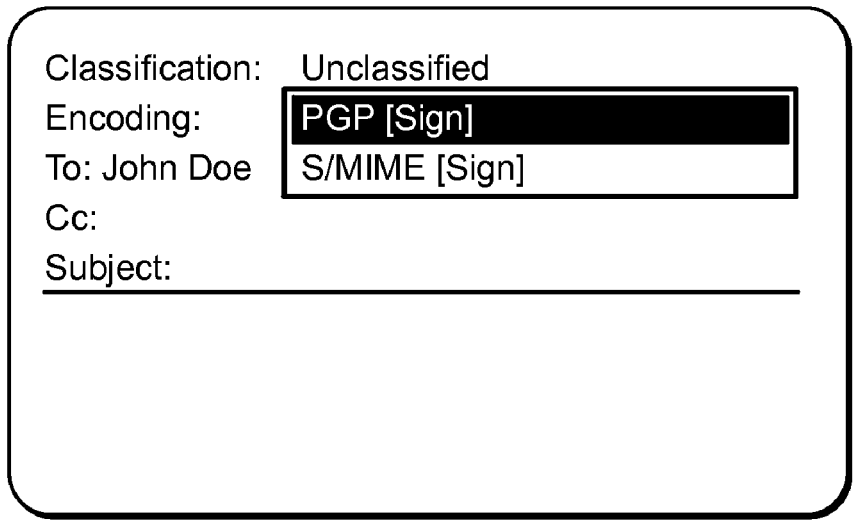

Examples of how the above-described exemplary embodiment may appear to a user are illustrated in FIGS. 7A-7G, which provide illustrative, non-limiting exemplary screen shots. For example, with reference to FIG. 7A, upon entering a "classification" field, the number of options available to the user may or may not change. For instance, as illustrated in FIG. 7A, if the user enters "unclassified" as the level of classification for the message, the security options displayed may include all options from the highest (e.g., PGP or S/MIME signed and encrypted) to the lowest (e.g. plain text). In this example, the user has selected "plain text" as shown in FIG. 7B. However, if the user selects, for example, "protected" as a classification for the message, as illustrated in FIG. 7C, the dynamic modification of allowable security options provides a list of security options available to the user that may be dynamically trimmed down to a lower number of options based on the protected nature of the classification. In this example, the available security encoding options may be trimmed to list only options that include an electronic signature requirement. Thus, "plain text" may no longer appear as an option in the situation where "protected" is entered in the classification field of the message as illustrated in FIG. 7C. FIG. 7D illustrates the display after one of the allowed options from the dynamically updated list of FIG. 7C has been selected. Various examples of such trimming are shown in FIGS. 7A-7G. For example, FIG. 7E illustrates an even further trimmed security encoding option list based on a classification of "top secret."

Other fields may also be monitored to determine whether and to what extent the security option list available to a user may be modified, e.g., trimmed or expanded. For example, with reference to FIGS. 7F and 7G, the user has selected an unclassified plain text message that is to be sent. However, the entry of the recipient as "John Doe" causes the dynamic updating of the security option list to reflect the system security policy in effect with respect to messages that are sent to John Doe. In this exemplary scenario, John Doe is an important official who can only receive electronic messages from employees if the message is a signed message. Thus, when "John Doe" is entered as the recipient by the user, the system acts to trim the security option list to include only those options that include a signature, as illustrated in FIG. 7G. It will be understood that any field may be monitored for any keyword. For example, internal project names or references that may be included in the text of the message may require enhanced security even if the rest of the message may be unclassified plain text. If such a keyword is detected, for example, in the subject line or text in the message itself, the security option list may be dynamically updated, e.g., trimmed, in accordance with exemplary embodiments described herein. In any event, the various fields are checked, and if dynamic updating of the list of security options is appropriate, the user is presented with an updated list of security options for application to the message.

Figure 6:
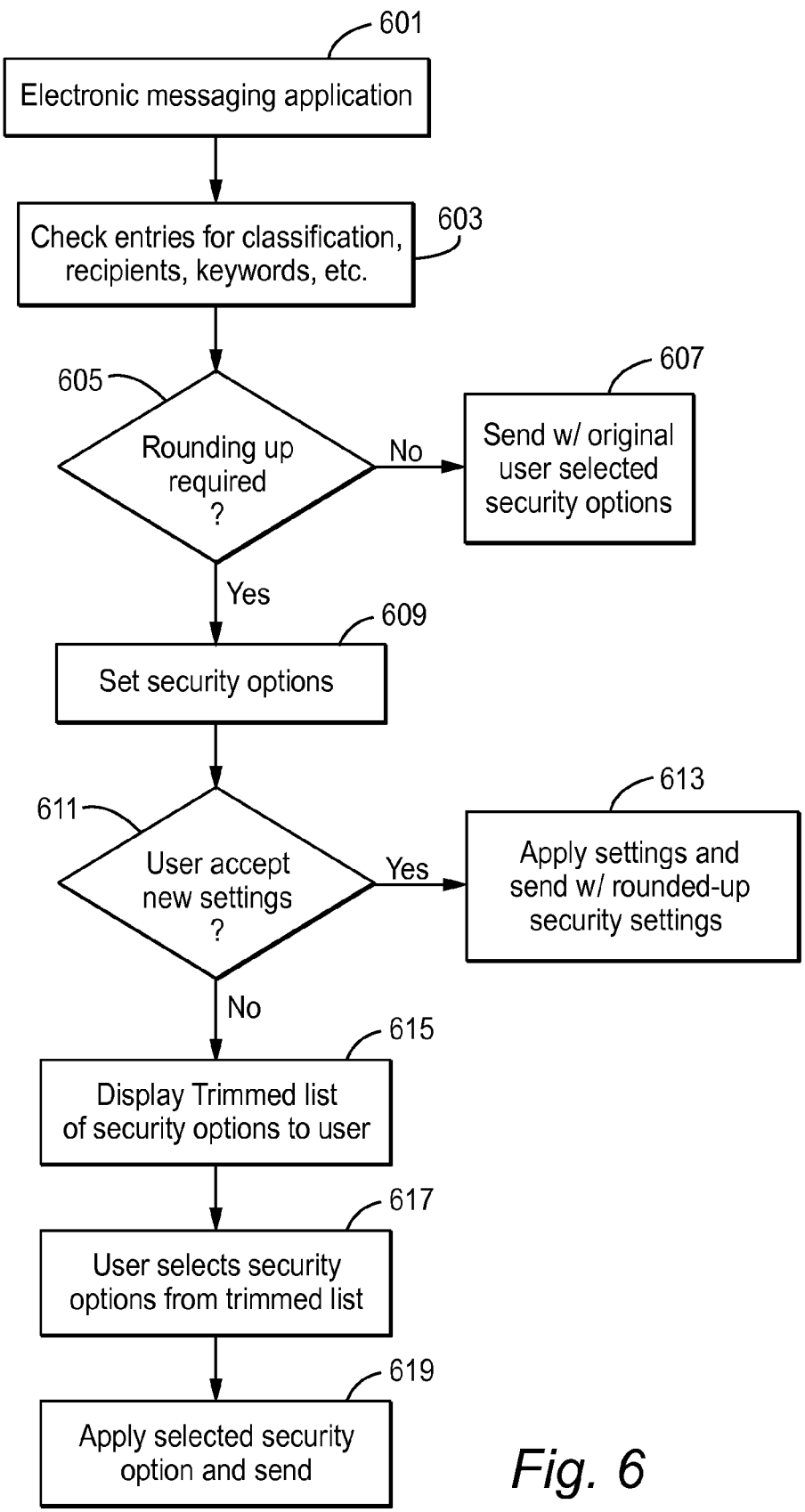
FIG. 6 is an exemplary abbreviated flow diagram of a system for dynamically and automatically rounding up security settings based on the contents of a message and optionally providing higher level security options to a user.

FIG. 6 is an exemplary abbreviated flow diagram of a system for dynamically and automatically rounding up security settings based on the contents of a message and optionally providing higher level security options to a user. According to this exemplary embodiment, the user enters the electronic messaging application 601, and enters information in the various fields. The entries in the various fields are monitored and checked 603 in a manner similar to that described above with reference to FIG. 5. If no modification of the security settings is required, the message may be sent with the original security options selected by the user 607. However, if the system detects an entry or keyword that requires modification of the security options available to the user 605, the system and method of this exemplary embodiment may automatically change the applied security options to a higher security level that reflects a minimum level of security commensurate with the security policy associated with the recipient 609. This type of automatic updating of security settings may be referred to as "rounding up" of the security settings. The user may either accept the automatically updated security settings 611 by, for example, executing the send command 613, or the user may optionally select from an updated, e.g., trimmed, list of security options 615 and select an even higher level of security encoding 617 for the message that is allowed by the security policy as reflected in the updated security properties or encoding options made available to the user 617. After making the selection 617, the user may then send the message with the selected security options having been applied thereto 619.

Figure 8:
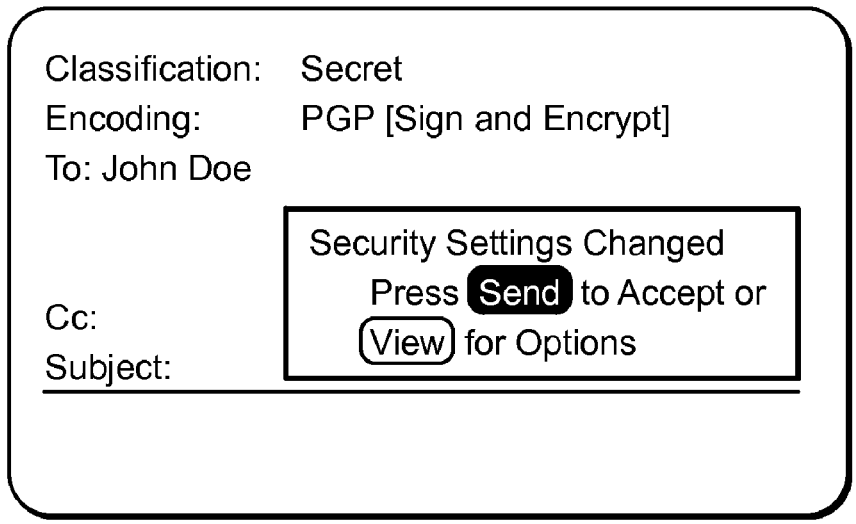
FIG. 8 is an exemplary screen shot illustrating an exemplary display of security options according to the embodiment illustrated in FIG. 6.

An example of how the exemplary embodiment illustrated in FIG. 6 may appear to a user is illustrated in FIG. 8. According to this example, entry of a "secret" classification and a recipient "John Doe" has caused the dynamic modification system to select a security option of "PGP [Sign and Encrypt]" for the message. The user is then prompted and provided to option to accept the system provided rounded-up security setting by pressing the send key, or to alternatively view other security options that would be presented in an updated, e.g., trimmed, security options list (not shown).

Figure 9:
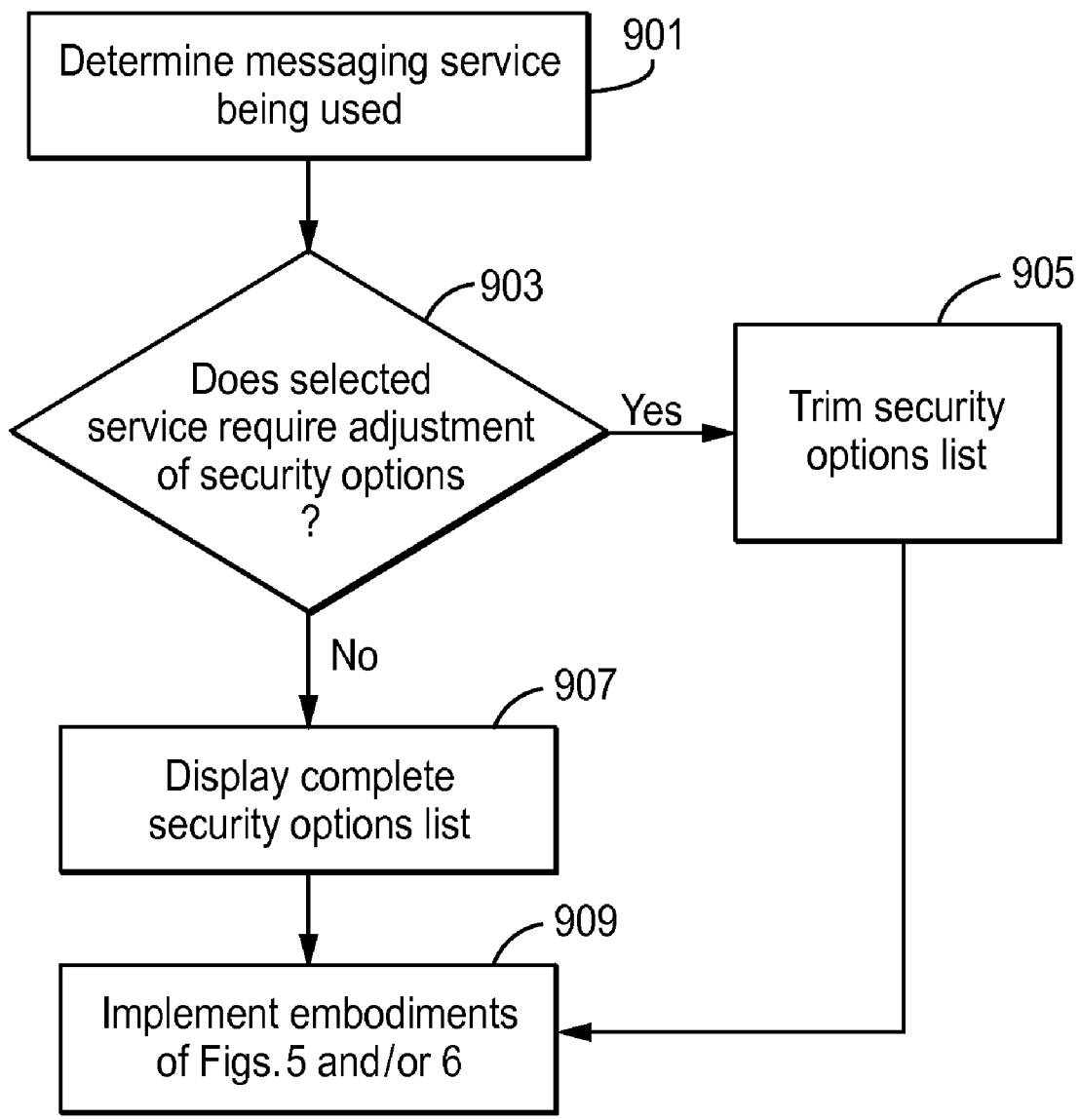
FIG. 9 is an exemplary abbreviated flow diagram of a system for dynamically and automatically updating security options available for a message based on which of multiple message services is being used to send a message.

FIG. 9 is an exemplary abbreviated flow diagram of a system for dynamically and automatically updating security options available for a message based on which of multiple message services is being used to send a message. According to this exemplary embodiment, the security settings may be adjusted based on the type of message service being used. For example, in a multiple message service environment in which multiple e-mail accounts are being used (e.g., home and office accounts), different classification levels and security policies may apply. Thus, the security options provided to the user may be based on the selection of which of multiple types of message services are being used. Once the messaging service, e.g., home or office, has been selected by the user 901, the system and method determines whether the security options list should be dynamically updated, e.g., trimmed or expanded, 903 based on the security policies that are in place for the system. If the list is to be updated, the updated, e.g., abbreviated, list of security options is displayed to the user 905. On the other hand, if the selected messaging service does not require any further modification of the security option list then the complete option list is displayed to the user 907. Whichever list is displayed is the basis for providing options going forward 909, for example, in accordance with the illustrative embodiments described with respect to FIGS. 5 and 6.

While the illustrative embodiments have been discussed with respect to security options, any other user options that are suited to being trimmed based on the contents of a message, the messaging service being used, or the like, are considered to be within the scope of this disclosure. Moreover, as discussed above, the security options may be based on rules associated with services provided by third parties other than the system administrator. For example, a third party server may be used to set up e-mail security policies for users of the system. The remainder of the system security policy may be handled by the system administrator. Restrictions that are provided by the third party server may be dynamically reflected to a user in a manner as set forth above so that the user may avoid making selections that are then later rejected because the selections violate the server based policies. The security policies that are set up by third parties may also implement the dynamic updating of security options provided to the user in the manner set forth herein with respect to the exemplary embodiments.

While the foregoing has been described in conjunction with specific exemplary embodiments, it is evident that many alternatives, modifications and variations will be apparent to those skilled in the art. Accordingly, the exemplary embodiments set forth herein are intended to be illustrative, not limiting. Various changes may be made without departing from the true spirit and full scope of the invention as defined in the appended claims.

What is claimed is:

1. A method for dynamic modification of allowable electronic message properties on a mobile device, the method comprising:
   generating an electronic message by receiving, via a user interface, one or more entries made in one or more various fields of the message, wherein an option from a first list of available security encoding options to apply to the message is available for selection;
   monitoring the one or more entries, while data is being entered in the one or more various fields via the user interface, to determine whether the one or more entries affect the first list of available security encoding options and, if so, automatically updating said first list of available security encoding options to apply to said message to generate a second list of available security encoding options, while the message is being composed;
   wherein the automatically updating is based on contents of the one or more entries and a system policy applicable to said contents;
   displaying the second list of available security encoding options to apply to the message based on the results of the monitoring and the automatically updating, while the message is being composed;
   wherein the second list of available security encoding options comprises a lower number of security encoding options than a number of security encoding options in the first list of available security encoding options, said lower number of security encoding options comprising a minimum encoding requirement; and
   receiving a selected security encoding option from the second list of available security encoding options to apply to the message, prior to sending the message.

2. The method according to claim 1, wherein the automatically updating of the first list of available security encoding options is based on a recipient of the message, a keyword present in the subject or text of the message, or a selected security classification of the message.

3. The method according to claim 1, wherein the automatically updating of the first list of available security encoding options is based on which of multiple types of messaging services is being used.

4. The method according to claim 1, wherein the system policy is provided as an IT policy managed by a system administrator or as a third party policy applied to an electronic messaging system.

5. The method according to claim 4, wherein the third party policy is provided by an electronic message server.

6. The method according to claim 1, wherein the electronic message is composed on a mobile wireless communication device.

7. The method according to claim 1, further comprising sending the message having the selected security encoding option applied thereto.

8. A system for dynamic modification of allowable electronic message properties, comprising:
   a mobile device capable of sending and receiving electronic messages and comprising a display;
   program logic resident on the mobile device for monitoring one or more entries in one or more various fields of an electronic message, while data is being entered in the one or more various fields via a user interface, to determine whether the one or more entries affect a first list of available security encoding options to apply to the message and, if so, automatically updating the first list of available security encoding options to apply to the message to generate a second list of available security encoding options, while the message is being composed;
   wherein the automatically updating is based on contents of the entries and a system policy applicable to the contents;
   said display configured to display the second list of available security encoding options to apply to the message based on the results of the monitoring and the automatically updating, while the message is being composed;
   wherein the second list of available security encoding options comprises a lower number of security encoding options than a number of security encoding options in the first list of available security encoding options, said lower number of security encoding options comprising a minimum encoding requirement; and
   wherein said communication device is configured to receive a selected security encoding option from the second list of available security encoding options to apply to the message, prior to sending the message.

9. The system according to claim 8, wherein the automatically updating of the first list of available security encoding options is based on a recipient of the message, a keyword present in the subject or text of the message, or a security classification for the message.

10. The system according to claim 8, wherein the automatically updating of the first list of available security encoding options is based on which of multiple types of messaging services is being used by the communication device.

11. The system according to claim 8, wherein the system policy is provided as an IT policy managed by a system administrator or as a third party policy applied to the system.

12. The system according to claim 11, wherein the system policy is provided by an electronic message server.

13. The system according to claim 8, wherein the mobile device comprises a mobile wireless communication device.

14. The system according to claim 8, wherein the communication device is configured to send the message having the selected security encoding option applied thereto.

15. A method for dynamic modification of allowable electronic message properties on a mobile device, the method comprising:
   generating an electronic message by receiving, via a user interface, one or more entries made in one or more various fields of the message, wherein an option from a first list of available security encoding options to apply to said message is available for selection;
   monitoring the one or more entries, while data is being entered in the one or more various fields via the user interface, to determine whether the one or more entries affect the first list of available security encoding options and, if so, automatically updating the first list of available security encoding options and identifying one or more security encoding options from the list to be applied to the message to generate a second list of available security encoding options, while the message is being composed;
   wherein the automatically updating is based on contents of the one or more entries and a system policy applicable to the contents;
   wherein the second list of available security encoding options comprises a lower number of security encoding options than a number of security encoding options in the first list of available security encoding options, said lower number of security encoding options comprising a minimum encoding requirement and other user-selectable security encoding options that conform to the system policy; and
   notifying via the user interface of the one or more identified security encoding options to be applied to the message.

16. The method according to claim 15, further comprising:
   selecting a higher level security encoding option to apply to said message;
   applying a higher level security encoding to the message; and
   sending the message with the higher level security encoding applied thereto.

17. The method according to claim 15, wherein the automatically updating of the first list of available security encoding options is based on a recipient of the message, a keyword present in the subject or text of the message, or a selected security classification for the message.

18. The method according to claim 15, wherein the automatically updating of the first list of available security encoding options is based on a recipient of the message, a keyword present in the subject or text of the message, or a selected security classification for the message.

19. The method according to claim 15, wherein the automatically updating of the first list of available security encoding options is based on which of multiple types of messaging services is being used.

20. The method according to claim 15, wherein the automatically updating of the first list of available security encoding options is based on which of multiple types of messaging services is being used.

21. The method according to claim 15, wherein the system policy is provided as an IT policy managed by a system administrator or as a third party policy applied to the electronic messaging system.

22. The method according to claim 21, wherein the system policy is provided by an electronic message server.

23. The method according to claim 15, wherein the electronic message is composed on a mobile wireless communication device.

24. The method according to claim 15, further comprising sending the message having the one or more identified security encoding options applied thereto.

25. A system for dynamic modification of allowable electronic message properties, comprising:
   a mobile device capable of sending and receiving electronic messages and comprising a display;
   program logic resident on the mobile device for monitoring one or more entries in one or more various fields of an electronic message via a user interface;
   the program logic further configured for determining, while data is being entered in one or more various fields via the user interface, whether the one or more entries affect a first list of available security encoding options to be applied to the message and, if so, automatically updating the first list of available security encoding options and identifying one or more security encoding options from the list to be applied to the message to generate a second list of available security encoding options, while the message is being composed;
   wherein the automatically updating is based on contents of the one or more entries and a system policy applicable to the contents
   wherein the second list of available security encoding options comprises a lower number of security encoding options than a number of security encoding options in the first list of available security encoding options, said lower number of security encoding options comprising a minimum encoding requirement and other user-selectable security encoding options that conform to the system policy; and
   said display providing a notification that the one or more security encoding options to be applied to the message has been identified.

26. The system according to claim 25, wherein:
   if a higher level security encoding option to apply to said message is selected;
   said program logic applies a higher level security encoding to the message; and
   said communication device sends the message with the higher level security encoding applied thereto.

27. The system according to claim 25, wherein the automatically updating of the first list of available security encoding options is based on a recipient of the message, a keyword present in the subject or text of the message, or a selected security classification for the message.

28. The system according to claim 25, wherein the automatically updating of the first list of available security encoding options is based on a recipient of the message, a keyword present in the subject or text of the message, or a selected security classification for the message.

29. The system according to claim 25, wherein the automatically updating of the first list of available security encoding options is based on which of multiple types of messaging services is being used.

30. The system according to claim 25, wherein the automatically updating of the first list of available security encoding options is based on which of multiple types of messaging services is being used.

31. The system according to claim 25, wherein the system policy is provided as an IT policy managed by a system administrator or as a third party policy applied to the electronic messaging system.

32. The system according to claim 31, wherein the system policy is provided by an electronic message server.

33. The system according to claim 25, wherein the mobile device comprises a mobile wireless communication device.

34. The system according to claim 25, wherein the communication device is configured to send the message having the one or more identified security encoding options applied thereto.

* * * * *